United States Patent Office
2,776,910
Patented Jan. 8, 1957

2,776,910

METHOD OF COATING GLASS FIBERS WITH REACTION PRODUCT OF ORGANO HALSILANES AND GLYCIDOL DERIVATIVES AND THEN WITH EPOXY RESINS AND THE PRODUCT PER SE

Porter W. Erickson, Silver Spring, and Irving Silver, Mount Rainier, Md., assignors to the United States of America as represented by the Secretary of the Navy No Drawing. Application February 10, 1954,
Serial No. 409,541

18 Claims. (Cl. 117—62)

(Granted under Title 35, U. S. Code (1952), sec. 266)

The invention described herein may be manufactured and used by or for the Government of the United States of America for governmental purposes without the payment of any royalties thereon or therefor.

This invention relates to chemical finishes for improving adhesion between the resin and reinforcement in reinforced plastics and more particularly to improved chemical finishes for increasing the adhesion between glass fibers used as reinforcements in epoxy resin laminates and to the method of applying such finish.

Finishes heretofore devised, though satisfactory with polyester type resins, have been only moderately successful with epoxy type resins. The finishes of this invention have been specifically designed to bond an epoxy type resin to a siliceous material and were formulated on the premise that one or more appropriate chemical groups in a silane type finish chemically bonded to a siliceous surface could take part in the curing reaction of an epoxy resin and thus adhesively bind together the resin and the siliceous surface with primary chemical bonds. To this end a halosilane is reacted with a glycidol derivative to form the new class of chemical finishes of this invention. The general structure of these finishes is presumed to be

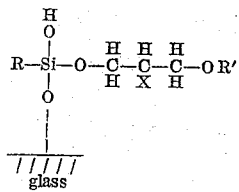

[1]

in which R is a methyl, vinyl, or allyl group, R' is an allyl or methacrylyl group and X is a halogen.

Finishes of the general structure 1 result from the treatment of a siliceous material with the reaction product of a halosilane and a glycidol derivative as exemplified by the reaction

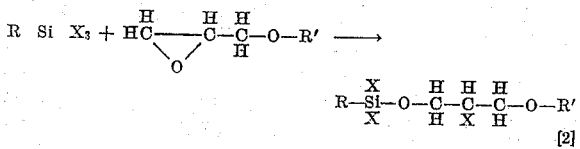

[2]

The product 2 of the reaction above is then diluted to substantially 5% or less in a nonpolar organic solvent, preferably xylol, and is used to treat desized glass fabrics or other siliceous filler material with the result that the reagent becomes firmly attached to the glass surface as exemplified below:

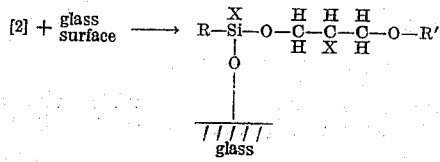

[3]

The treated siliceous material is washed with xylol several times and then air dried. Thereafter the treated stock may be given a water rinse, resulting in the structure 1 indicated above. It is believed that reaction 3 is a result of the interaction of compound 2 with the sheath of adsorbed water which normally covers glass and related ceramic materials under prevailing conditions of relative humidity and that the silane replaces this water molecule for molecule, and becomes firmly bonded to the glass either through adsorptive forces or as a result of formation of primary chemical bonds between the resin and the glass as is evidenced, in part, by the difficulty of removing the finish from the glass after treatment thereof as taught herein. Though this theory and the mechanism of the reaction above is advanced to the account for the excellent results obtained by the practice of this invention, the specification is not to be construed as being limited thereby since the finishes herein disclosed are useful independently of any theoretical considerations.

If desired, the above reaction may be carried out in the presence of a minor quantity [0.01 molar equivalent] of an acid acceptor such as a sterically hindered weak organic base such as triphenylamine or diphenylamine, for example, which serves to reduce the acid condition in the reaction mixture. The finish may be further modified by copolymerizing the finish applied as outlined above with either of the above glycidol derivatives in the presence of a vinyl polymerizing catalyst such as "DDM" [methylethylketone peroxide] with or without Nuodex, 6% cobalt [cobalt naphthenate]. The reinforcement treated as above may be laminated by conventional laminating procedures using an epoxy resin, such as Epon RN–48 and Shell curing agent D. Laminates made with 181 style glass cloth which had previously been desized and to which the new finishes above were applied gave ultimate flexural strength, ranging from $78.6 \times 10^3$ to $92.0 \times 10^3$ p. s. i. dry, and from $61.0 \times 10^3$ to $72.8 \times 10^3$ p. s. i. after a two hour period in boiling water.

Accordingly, it is an object of this invention to provide new and improved finishes for siliceous laminating materials.

It is a further object of this invention to provide new compounds useful for finishing siliceous materials to improve the adhesion between the material and resin in laminates.

It is a still further object of this invention to provide a method of treating glass laminating materials to improve the adhesion of such materials with epoxy resins.

Another object of this invention is to provide a finish for glass fibers which increases the adhesion between the fibers and epoxy resins.

Still another object of the invention is to provide a finish for and method of finishing siliceous fibers to improve the wet strength of laminates made therewith.

Other objects and many of the attendant advantages of this invention will be readily appreciated as the same becomes better understood by reference to the following detailed description.

The novel compounds of this invention are prepared by reacting either a methyl halosilane, a vinyl halosilane or an allyl halosilane with a molar equivalent of either glycidyl allyl ether or glycidyl methacrylate. The haosilane, preferably the chlorosilane, when added to a molar equivalent of either glycidol derivative reacts with the evolution of heat. The reaction is permitted to proceed to completion, preferably in a water bath to cool the reaction mixture to approximately room temperature. It has been found that the reaction proceeds to substantial completion in twenty-four hours or less.

If desired, the reaction may be carried out in the presence of a 0.01 molar equivalent of an acid acceptor which serves to eliminate trace amounts of hydrogen chloride which may be formed if small amounts of water are present. Such an acid acceptor may be a sterically hindered weak organic base such as triphenylamine or diphenylamine, for example. It has been found that the addition of such an acid acceptor to either the reaction mixture or the solution of the reaction products, as will be subsequently described, results in improved properties in the final laminate.

The product of the above reaction is then diluted in a suitable solvent preferably a non-polar organic solvent such as xylol, benzene or toluene. The concentration of this solution is not critical and it has been found that concentrations of 5% or less are adequate for the treatment of relatively large quantities of siliceous material. Concentrations of 2½% of the compound in the solvent have been found to yield good results in the treatment of glass fabrics and an increase above the 5% concentration did not appear to serve any useful purpose. Suitable siliceous reinforcing materials such as glass fabrics and fibers which have been previously desized may be treated with the reaction product by immersing the fabric in the solution or by spraying or otherwise applying the solution thereto. Substantially 15 minutes has been found to be adequate time for the treatment of the siliceous material. Thereafter the treated material is washed several times with a solvent (which may be the same as above) and then air dried.

As has been indicated above, if desired, an acid acceptor may be added to the solution rather than the reaction mixture with the same beneficial results and increased strength in the final laminate. The fabric or other reinforcing material treated as above outlined may be further treated by giving it a final water rinse. It is believed that this water rinse results in the hydrolysis of the halogen substituted in the silane to give an hydroxyl group which in the subsequent lamination can take part in the curing reaction of the epoxy resin to bind together the resin and glass with primary chemical bonds, thus increasing the strength of the resulting laminate.

The finish applied as heretofore described may be further modified by a copolymerization treatment with either of the glycidol derivatives described above. This copolymerization may be carried out by treating the fabric with a solution of the glycidol derivative in the presence of a vinyl polymerizing catalyst such as "DDM" [methyl-ethylketone peroxide] with or without Nuodex, 6% cobalt [cobalt naphthenate]. This copolymerizing treatment has been found in most instances to increase the strength of the final laminate as shown by the data hereinafter to be outlined. Solutions of the glycidol derivatives in non-polar solvents in concentrations of 5% or less were found to be suitable.

The fabric treated as above outlined may be then laminated with an epoxy resin in any manner customary in the art. A typical epoxy resin Epon RN-48, and Shell curing agent D, was used as the laminating resin in the examples described below to assure comparable results. In each of the examples which follow, the laminating was carried out in the same manner and a 181 style glass fabric which had been thoroughly heat cleaned to remove all traces of weaving aids therefrom was used as the reinforcement. The dry and wet ultimate flexural strengths were determined by standard procedures, the wet strength of the laminate being determined after immersion of the laminate for three hours in boiling water and subsequent immersion in water at 77° for fifteen minutes prior to testing.

*Example 1*

Heat cleaned glass fabric was given a fifteen minute treatment in a 5% xylol solution of the product resulting from reaction of the methyl trichlorosilane and glycidyl allyl ether, washed in xylol, air dried and laminated with Epon RN-48. The resulting laminate gave good wet and dry strength.

*Example 2*

Glass fabric finished in the manner described above was air dried and given a water rinse. The resulting laminate had an ultimate flexural strength greater than that of the laminate resulting from Example 1.

*Example 3*

The glass fabric was treated in the same manner as was the fabric of Example 1 with the exception that a 0.01 molar equivalent of triphenylamine was added to the solution. Resin-glass adhesion superior to that of either Examples 1 or 2 was obtained in the resulting laminate. Furthermore, the strength of the laminate formed with fabric treated by the method of this example exceeded that of laminates formed from fabric treated with the best commercial finish, yielding dry and wet ultimate flexural strengths of $84.4 \times 10^3$ and $61.0 \times 10^3$ p. s. i., respectively. The corresponding moduli were $3.56 \times 10^6$ and $3.20 \times 10^6$ p. s. i.

*Example 4*

Heat cleaned glass fabric was given a fifteen minute treatment in a 5% xylol solution of the product resulting from the reaction of vinyl trichlorosilane and glycidyl allyl ether. Tests indicated that a final water rinse of treated and dried fabric led to improved resin glass adhesion. When the finish was applied in the presence of a 0.01 molar equivalent of triphenylamine, the resulting laminate gave dry and wet ultimate flexural strengths of $78.6 \times 10^3$ and $61.9 \times 10^3$ p. s. i., respectively. The corresponding moduli were $3.56 \times 10^6$ and $3.20 \times 10^6$ p. s. i.

*Example 5*

Glass fabric was given a fifteen minute treatment in a 5% xylol solution of the product resulting from the reaction of allyl trichlorosilane and glycidyl allyl ether. Tests indicated that a final water rinse of the treated dried fabric led to improved resin glass adhesion. The presence of a 0.01 molar equivalent of triphenylamine in the solution above was found to further increase the strength of the finished laminate. The strength of this laminate exceeded the strength of laminates made with the best finish heretofore known. This finish yielded a laminate having wet and dry ultimate flexural strength of $87.5 \times 10^3$ and $72.8 \times 10^3$ p. s. i., respectively. The corresponding moduli were $4.75 \times 10^6$ and $4.54 \times 10^6$.

*Example 6*

Heat cleaned glass fabric was given a fifteen minute treatment in a 5% xylol solution of the product resulting from the reaction of methyl trichlorosilane and glycidyl methacrylate. Screening tests showed that this finish led to better resin glass adhesion than could be obtained with the best heretofore known commercial finish. Laminates made from fabric finished as hereinabove described and hydrolyzed by a subsequent water rinse gave wet and dry ultimate flexural strengths of $83.3 \times 10^3$ and $72.5 \times 10^3$ p. s. i., respectively. The corresponding moduli were $4.06 \times 10^6$ and $5.89 \times 10^6$ p. s. i.

*Example 7*

Heat cleaned glass fabric was given a fifteen minute treatment in a 5% xylol solution of the product of the reaction of vinyl trichlorosilane and glycidyl methacrylate. The air dried fabric was then water washed and again dried and subsequently given a final treatment for one half hour at 100° C. in a 5% xylol solution of glycidyl methacrylate containing trace amounts of DDM and Nuodex catalysts. This finish led to better resin glass adhesion than could be obtained with heretofore known commercial finishes.

*Example 8*

Glass fabric was treated with a 2½% xylol solution of the product resulting from the reaction of vinyl trichlorosilane and glycidyl methacrylate and thereafter treated with a 1¼% xylol solution of glycidyl methacrylate and catalyst in the manner described above. The dry and wet ultimate flexural strengths of the resulting laminate were $82.3 \times 10^3$ and $67.4 \times 10^3$ p. s. i., respectively. The corresponding moduli were $4.69 \times 10^6$ and $4.76 \times 10^6$ p. s. i.

*Example 9*

Heat cleaned fabric was given a fifteen minute treatment in a 5% xylol solution of the product resulting from the reaction of allyl trichlorosilane and glycidyl methacrylate. The air dried fabric was then water washed, dried and given a second treatment for one half hour at 100° C. in a 5% xylol solution of glycidyl methacrylate containing trace amounts of DDM and Nuodex catalysts. This finish led to better resin glass adhesion than was possible with heretofore known commercial finishes.

*Example 10*

Glass fabric was treated with a 2½% solution of the reaction product of allyl trichlorosilane and glycidyl methacrylate and was given a subsequent water wash and treated with glycidyl methacrylate and catalyst as described above. The resulting laminate gave dry and wet ultimate flexural strengths of $92.0 \times 10^3$ and $70.8 \times 10^3$ p. s. i., respectively. The corresponding moduli were $4.60 \times 10^6$ and $4.02 \times 10^6$ p. s. i.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The compound

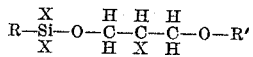

where R is selected from the group consisting of methyl, vinyl and allyl radicals and R' is selected from the group consisting of methacrylyl and allyl radicals and X is a halogen.

2. A chemical finish for improving the adhesion between siliceous reinforcement and a resin comprising a solution in a non-polar organic solvent of the product of the reaction of molar proportions of a compound selected from the group consisting of methyl trihalosilane, vinyl trihalosilane, and allyl trihalosilane with a compound selected from the group consisting of glycidyl allyl ether and glycidyl methacrylate.

3. A chemical finish for improving the adhesion between siliceous reinforcement and a resin comprising a xylol solution of the reaction product of molar proportions of a compound selected from the group consisting of methyl trihalosilane, vinyl trihalosilane and allyl trihalosilane and a compound selected from the group consisting of glycidyl allyl ether or glycidyl methacrylate.

4. A chemical finish for improving the adhesion between siliceous reinforcement and epoxy resins comprising a solution of the product of the reaction of molar proportions of a compound selected from the group consisting of methyl trihalosilane, vinyl trihalosilane and allyl trihalosilane with a compound selected from the group consisting of glycidyl allyl ether and glycidyl methacrylate, and a minor proportion of an organic base as an acid acceptor.

5. A chemical finish for improving the adhesion between glass fibers and epoxy resins comprising a solution of the reaction product of molar proportions of a compound selected from the group consisting of methyl trihalosilane, vinyl trihalosilane and allyl trihalosilane and a compound selected from the group consisting of glycidyl allyl ether and glycidyl methacrylate in a non-polar organic solvent and a minor proportion of a weak organic base as an acid acceptor.

6. A chemical finish for improving the adhesion between glass fibers and epoxy resins comprising a xylol solution of the product of the reaction of molar proportions of a compound selected from the group consisting of methyl trihalosilane, vinyl trihalosilane and allyl trihalosilane with a compound selected from the group consisting of glycidyl allyl ether and glycidyl methacrylate in the presence of a minor proportion of triphenylamine.

7. The method of finishing siliceous reinforcement to improve the adherence between resin and reinforcement in laminates which comprises the step of treating the reinforcement with the reaction product of molar proportions of a compound selected from the class consisting of methyl trihalosilane, vinyl trihalosilane and allyl trihalosilane and a compound selected from the class consisting of glycidyl allyl ether and glycidyl methacrylate.

8. The method of improving the adherence between resin and reinforcement in laminates which comprises the step of treating a siliceous reinforcement with a solution of the reaction product of molar proportions of a compound selected from the class consisting of methyl trihalosilane, vinyl trihalosilane and allyl trihalosilane and a compound selected from the class consisting of glycidyl allyl ether and glycidyl methacrylate and thereafter rinsing the treated reinforcement in water.

9. The method of improving the adherence between resin and reinforcement in laminates which comprises the step of treating glass reinforcement with a solution of the reaction product of molar proportions of a compound selected from the class consisting of methyl trihalosilane, vinyl trihalosilane and allyl trihalosilane and a compound selected from the class consisting of glycidyl allyl ether and glycidyl methacrylate in the presence of a minor portion of triphenyl amine.

10. The method of improving the adherence between resin and reinforcement in laminates which comprises the step of treating a siliceous reinforcement with a solution of the reaction product of molar proportions of a compound selected from the class consisting of methyl trihalosilane, vinyl trihalosilane and allyl trihalosilane and a compound selected from the class consisting of glycidyl allyl ether and glycidyl methacrylate in the presence of a minor portion of triphenyl amine, and thereafter rinsing the treated reinforcement in water.

11. The method of improving the adhesion between resin and reinforcement in laminates which comprises the step of treating glass fibers with a solution in an organic solvent of the reaction product of molar proportions of a compound selected from the class consisting of methyl trihalosilane, vinyl trihalosilane and allyl trihalosilane and a compound selected from the class consisting of glycidyl allyl ether or glycidyl methacrylate in the presence of a minor portion of triphenyl amine, washing the treated fiber in a solvent, drying the washed fiber, rinsing the washed fiber in water, again drying the fiber and thereafter treating the reinforcement with a compound selected from the class consisting of glycidyl methacrylate and glycidyl allyl ether in the presence of a catalyst.

12. The method of improving the adherence between epoxy resins and reinforcement in laminates which comprises the step of treating glass fiber with a xylol solution of the reaction product of a compound selected from the class consisting of methyl trihalosilane, vinyl trihalosilane and allyl trihalosilane and a glycidyl derivative selected from the class consisting of glycidyl allyl ether and glycidyl methacrylate in the presence of a minor portion of triphenyl amine, washing the treated fiber in xylol, air drying the washed fiber, rinsing the washed fiber in water, again drying the fiber, and thereafter treating the fiber with a xylol solution of a compound selected from the aforesaid class of glycidol derivatives together with a vinyl polymerization catalyst.

13. The method of improving the adherence between epoxy resins and reinforcement in laminates which comprises the step of treating glass fiber with a xylol solution of the reaction product of molar proportions of a compound selected from the class consisting of methyl trichlorosilane, vinyl trichlorosilane and allyl trichlorosilane and a glycidol derivative selected from the class consisting of glycidyl allyl ether and glycidyl methacrylate in the presence of a minor portion of triphenyl amine, washing the treated fiber in xylol, air drying the washed fiber, rinsing the washed fiber in water, again drying the fiber and thereafter treating the fiber with xylol solution of a compound selected from the aforesaid class of glycidol derivatives together with a vinyl polymerization catalyst.

14. The compound of claim 1, wherein R is a methyl radical.

15. The compound of claim 1, wherein R is a vinyl radical.

16. The compound of claim 1, wherein R is an allyl radical.

17. The compound of claim 1, wherein R' is a methacrylyl radical.

18. The compound of claim 1, wherein R' is an allyl radical.

References Cited in the file of this patent

UNITED STATES PATENTS 2,650,934     Rust et al. _____ Sept. 1, 1953